US00RE37182E

(19) United States
(12) Reissued Patent
Fasullo et al.

(10) Patent Number: US RE37,182 E
(45) Date of Reissued Patent: May 22, 2001

(54) BUS STRUCTURE FOR POWER SYSTEM

(75) Inventors: Greg H. Fasullo, Dallas; A. S. Herbert, Richardson, both of TX (US)

(73) Assignee: Lucent Technologies Inc., Murray Hill, NJ (US)

(21) Appl. No.: 09/291,650

(22) Filed: Apr. 12, 1999

Related U.S. Patent Documents

Reissue of:
(64) Patent No.: 5,623,173
Issued: Apr. 22, 1997
Appl. No.: 08/210,213
Filed: Mar. 18, 1994

(51) Int. Cl.[7] ..... H02J 7/00
(52) U.S. Cl. ..... 307/150; 307/18; 307/43; 307/80
(58) Field of Search ..... 307/147, 150, 307/43, 151, 80, 85, 18, 19, 20, 22, 23, 24, 25, 26, 28, 29, 21, 44, 82, 148, 149; 361/728–730; 439/166, 170–172, 217, 222; 701/29–36, 1; 340/425.5, 438, 459–462, 825.3

(56) References Cited

U.S. PATENT DOCUMENTS

| | | | | |
|---|---|---|---|---|
| 4,551,801 | * | 11/1985 | Sokol | 340/462 |
| 4,638,178 | | 1/1987 | Kayser | 307/85 |
| 4,675,538 | | 6/1987 | Epstein | 307/64 |
| 4,985,806 | | 1/1991 | Mazzullo et al. | 361/392 |
| 5,073,773 | * | 12/1991 | Van Steenbrugge et al. | 340/825.3 |
| 5,089,937 | | 2/1992 | Carrubba et al. | 361/394 |
| 5,440,449 | | 8/1995 | Scheer | 361/686 |
| 5,538,436 | | 7/1996 | Garney | 439/270 |

FOREIGN PATENT DOCUMENTS

| | | | |
|---|---|---|---|
| 3541273 A1 | 5/1987 | (DE) | H02M/1/08 |
| 0 409 226 A2 | 1/1991 | (EP) | H02J/3/00 |

OTHER PUBLICATIONS

"A Highly Efficient. Low–profile 300–W Power Pack for Telecommunications Systems" by N. Murakami, I. Yumoto, T. Yachi and K. Maki; 1994 IEEE; pp. 786–792.

* cited by examiner

*Primary Examiner*—Albert W. Paladini

(57) ABSTRACT

A power system plant includes a backplane arrangement including a primary and secondary bus to which intermediate power processing modules are selectively connected to the input and output power control and monitors of the plant. The backplane connections are controlled by the plug-in power processing modules[.], the resulting connections are unique to the type of plug-in module [placeed] *placed* on an input shelf (i.e. rectifier or converter plug-in module) and determine how the plant is to operated. The connections of these plug-in modules to the backplane connector are such that the plug-in module is designed to have its connectors connect to either primary or secondary referenced control signals. The connectors of the backplane accept both type of plug-in modules so that any plug-in module inserted is automatically connected to respond to the appropriate primary or secondary referenced control signals.

56 Claims, 3 Drawing Sheets

"AMENDED"

*FIG. 3*

| PIN# | DESCRIPTION | PIN# | DESCRIPTION | PIN# | DESCRIPTION |
|---|---|---|---|---|---|
| Z2 | R/C+ | B2 | R/C+ | D2 | R/C+ |
| Z4 | R/C+ | B4 | R/C+ | D4 | R/C+ |
| Z6 | R/C+ | B6 | R/C+ | D6 | RS+ |
| Z8 | R/C- | B8 | R/C- | D8 | RS- |
| Z10 | R/C- | B10 | R/C- | D10 | R/C- |
| Z12 | R/C- | B12 | R/C- | D12 | R/C- |
| Z14 | R_CM+ | B14 | R_VADJ+ | D14 | R_VADJ- |
| Z16 | R_CS+ | B16 | R_CS- | D16 | RFA |
| Z18 | C_O/S_OUT | B18 | AR | D18 | R_O/S_OUT |
| Z20 | CFA | B20 | LT | D20 | ACF(1) |
| Z22 | C_CS+ | B22 | RING_ID1 | D22 | ACF(2) |
| Z24 | RING_ID2 | B24 | C_VADJ+ | D24 | C_VADJ- |
| Z26 | C_CM+ | B26 | C- | D26 | C- |
| Z28 | C- | B28 | C- | D28 | C- |
| Z30 | C_HV | B30 | C+ | D30 | C+ |
| Z32 | C+ | B32 | C+ | D32 | C+ |

BUS STRUCTURE FOR POWER SYSTEM

Matter enclosed in heavy brackets [ ] appears in the original patent but forms no part of this reissue specification; matter printed in italics indicates the additions made by reissue.

FIELD OF THE INVENTION

This invention relates to power system plants in which intermediate power processing modules are mounted in a housing structure of a power plant and between input and output power access modules of that plant; and in particular to a backplane bus structure providing a particular control structure for accepting and controlling different types of inserted power processing modules.

BACKGROUND OF THE INVENTION

Power plant systems, having input and output power access with intermediate power processors are usually designed with a particular control structure and with anticipated operation using only one type of intermediate plug-in processor. The overall plant structure is usually limited to one type of control and is not readily changeable to use plug-in power processors of the other type control and power output and hence can not accommodate differing plug-in power processing modules.

SUMMARY OF THE INVENTION

A power system plant includes a backplane arrangement including a primary and secondary bus to which intermediate power processing modules are selectively connected to the input and output power control and monitors of the plant. The backplane connections of the plug-in intermediate power processing modules are unique to the type of plug-in module placed on an input shelf (i.e. rectifier or converter plug-in module) and how the plant is to be operated. The connections of these plug-in modules to the backplane connector are such that the plug-in module is designed to have its connectors connect to either primary or secondary referenced control signals. The connectors of the backplane accept both type of plug-in modules so that any plug-in module inserted is automatically connected to respond to the appropriate primary or secondary referenced control signals.

The power plant system includes control signal generators and signal references for the primary bus and the secondary bus. The backplane connectors of the plug-in module are designed to connect through the appropriate bus to one or the other of these control signal sources. Its backplane connectors also connect to one or the other of the primary or secondary busses to receive alarm return referenced control signals. The power plant system operates in a rectifier or converter plant mode determined by signal interconnections made within the backplane of the system.

The completed backplance connections for the rectifiers and converters are unique from one another although the connection receptacles are the same regardless of application.

BRIEF DESCRIPTION OF THE DRAWING

FIG. 3 is a table of pinouts at the power module interface.

DETAILED DESCRIPTION

Figure 1:
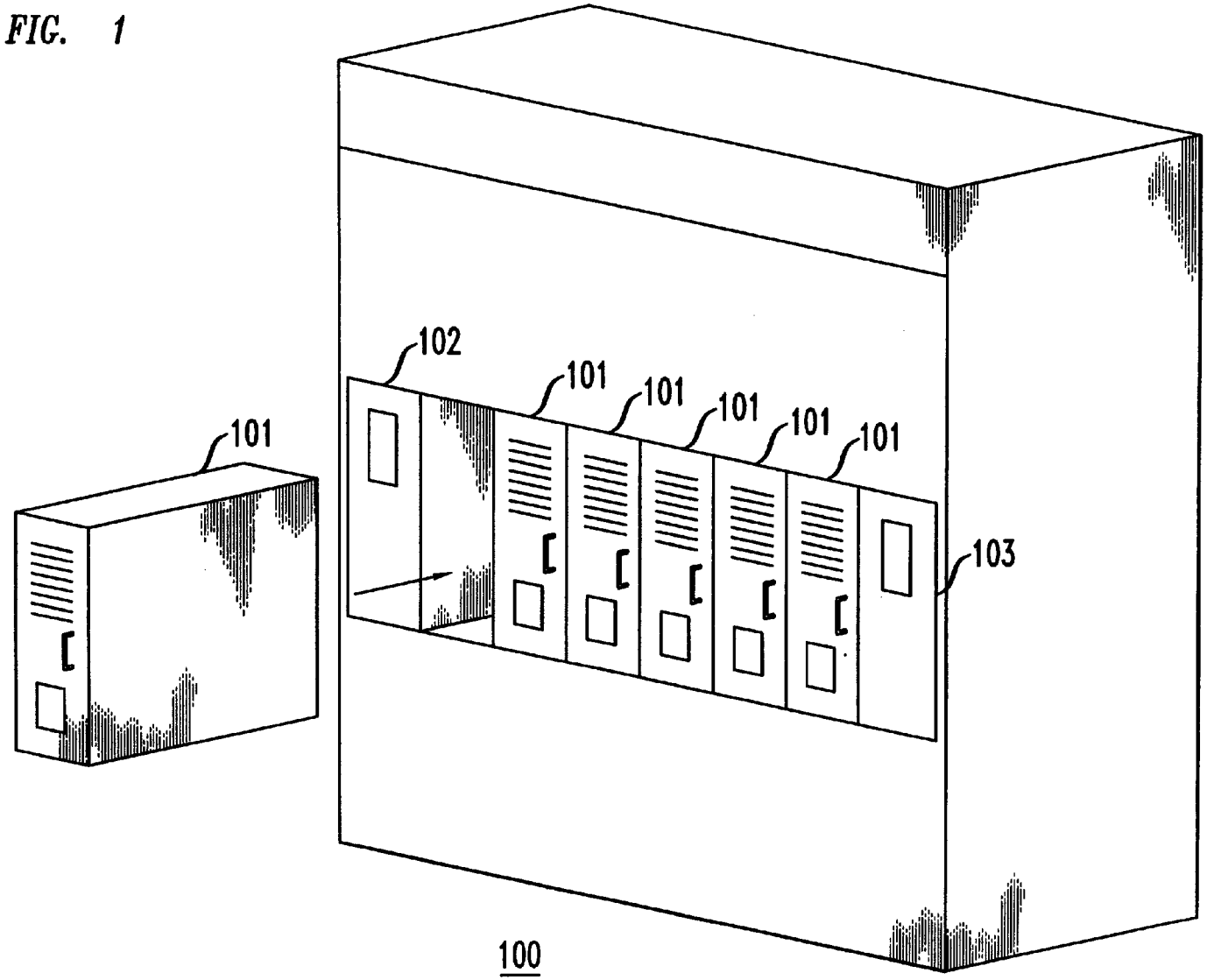
FIG. 1 is a pictorial schematic of a power plant system housing including a plurality of plug in modules which are included to process power between an input and output power module.

A power distribution chassis or housing 100 of a power plant as shown in the FIG. 1 includes a plurality of plug-in power modules 101 which slide into a shelf of the housing and connect to a backplane at the rear of the shelf. This backplane includes a primary and secondary bus to which the plug-in modules 101 are connected by plug of similar connectors to plug receptacles of the back plane bus structure provided in the housing, which as described below are structured to allow selection to accept a rectifier or converter plug-in module determined by how the plug-in module 101 connects to the backplane structure. A plant monitor and control 102 is connected to the backplane in a manner common to use either as a rectifier or converter system. Output power characteristics are monitored by unit 102. An output power section 103 (i.e. permanent; not a plug-in module) is connected to the backplane structure and provides power output to a load. One of the plug-in power modules 101 is shown prior to insertion into the shelf and consequent connection to the backplane. The [back plane] *backplane* electrically (not shown) connects the plug-in modules 101 into the electrical system between input and output modules 102,103 and provides power processing of the electrical power there between. The input control module 102 normally provides the desired control signals for the plug in modules and is connected to monitor the appropriate monitored signals as determined by the plug-in connection pattern of the plug-in module.

Figure 2:
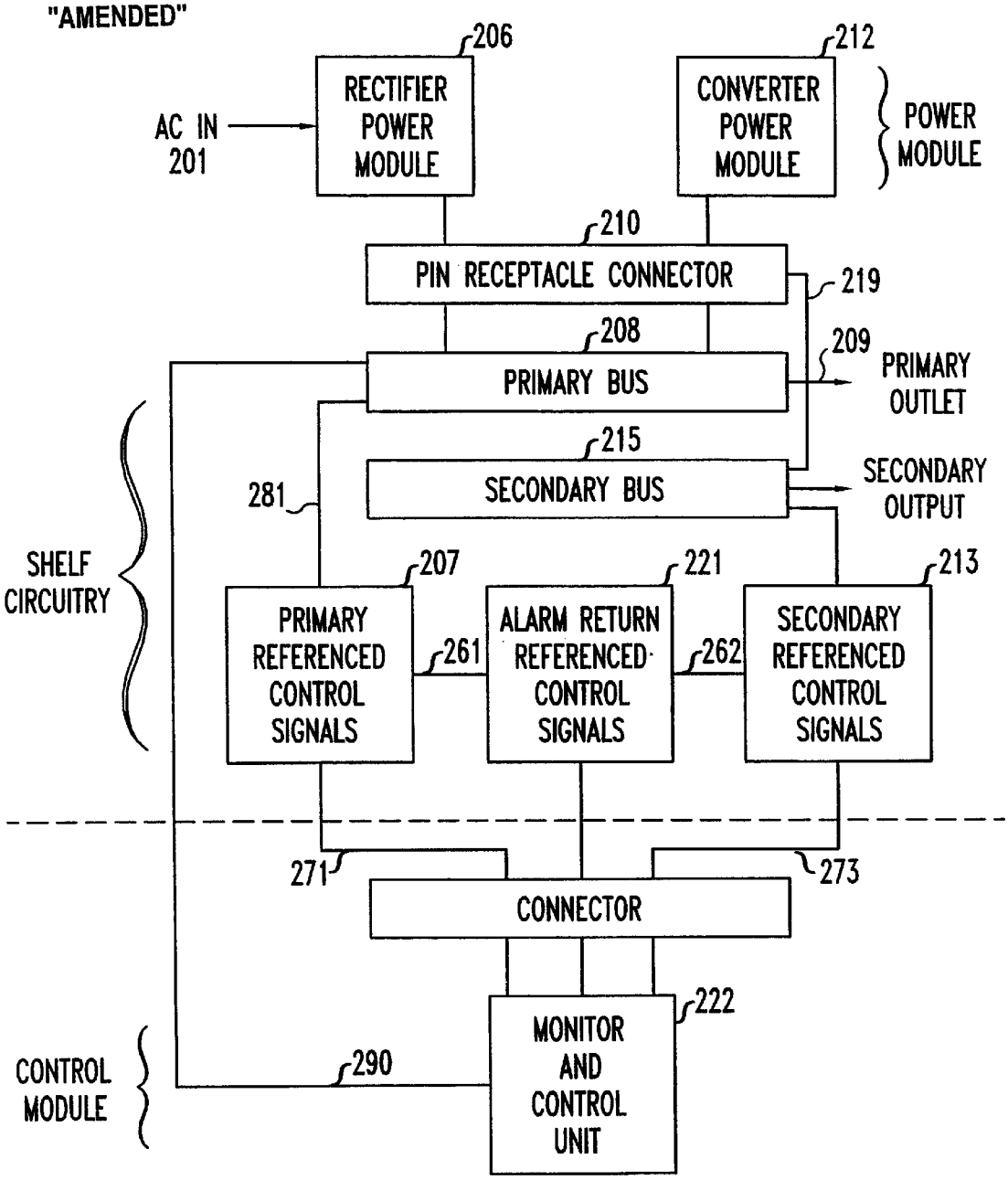
FIG. 2 is a block schematic of how the plug-in power processing modules may be connected to a backplane bus arrangement of the power plant system housing.

The organization of a backplane for the power plant housing of FIG. 1, as shown in the FIG. 2, allows the particular connections of the plug-in power processing modules to accept the rectifier and converter plug-in modules on a single shelf. Plug-in pins are included in a plug-in apparatus 210 in which pins of a plug-in module 206 and 212 [are made] *mate* with selected receptacles of apparatus 210. The input AC power is applied at lead 201 of the power plant housing and is applied individually to each of the plug-in modules. Hence, in a shelf of five modules each would have an AC input. Plug-in module 206, as shown in FIG. 2, is a rectifier module. The power output of the rectifier module 206 is applied to a primary bus 208 by means of a mating of connectors of the module 206 in apparatus 210 and in the backplane of the power system housing. The primary bus 208 may supply power to a load at output lead 209 and connected by a connector in the backplane to a subsequent converter plug-in module 212. The converter module 212 connected to apparatus 210 includes conversion circuitry for converting voltage from one DC level to another DC level, or from a DC voltage to an AC voltage. Its output power is applied to a secondary bus 215 via lead 219 which is normally connected to a load to be energized.

A source of primary reference control signals 207 supplied by the monitor and control is connected to the primary bus 208 and through that bus to the rectifier module 206. A source of secondary reference control signals 213 supplied by the monitor and control is connected to the secondary bus 215 and through that bus to the converter module 212.

An alarm return circuit 221 and monitor and control module 222 is included as a module in the plant housing or housing. The monitor and control module *222* is connected to the primary bus *208*, via lead 290, to monitor the characteristic power signals of the plant. When a rectifier 206 is plugged in the connecting leads 271 and 281 are activated through backplane connections to connect to the control circuit 207 of the rectifier and to the primary bus 208 respectively. An alarm return circuit 221 is provided for each shelf while the control module 222 is common to the entire power plant.

With a converter 212 plugged in the connecting leads are activated through backplane connections to connect to the secondary reference control signals 213 and to the secondary bus 215 respectively.

The plant operates as an overall system as either a rectifier plant or a converter plant (note that either plant may include rectifier and converter plug in units). The determination of the overall plant operation is set by the connections between the monitor and control unit *222* and the alarm return *221* and the primary referenced control signals *207* and secondary referenced control signals *213*. For operation as a rectifier plant system the [connections the] *connecting* leads 261 and 271 are enabled and the leads 262 and 273 are disabled. In operation as a converter plant system leads 261 and 271 are disabled and leads 262 and 273 are enabled. These connections are made within the shelf circuitry of the backplane as shown in the FIG. 2.

The aforementioned interconnections to the primary bus and secondary bus are controlled by the different portions of hardwired connector geometry or pin arrangement in the back plane of the shelf of the power plant. The action of plugging in a rectifier or converter assures connection to the proper control and power train connections to enable the operation of that module automatically in the power system.

A particular pinout arrangement is shown in the table at FIG. 3.

The following is a description of the pinouts for the power module interface. The naming convention defines primary bus power modules to be rectifiers and secondary bus power modules to be converters.

The signals referenced to the primary output bus are:

| | |
|---|---|
| R/C+ and R/C− | Primary bus power output connections. |
| RS+ and RS− | Remote sense leads for the rectifier power modules. These signal pins allow the rectifiers on the primary bus voltage to regulate the output voltage of the plant rather than their own internal voltage. |
| R_CM+ | Current monitor output for the rectifiers. This signal interconnects the power modules to the control unit, allowing the control unit to monitor the primary bus output current. |
| R_VADJ+ and R_VADJ− | Rectifier voltage control leads. These signals interconnect the power modules to the control unit to allow the control unit to adjust the primary bus output voltage. |
| R_CS+ and R_CS− | Rectifier current share control leads. These signals interconnect the power modules and allow them to share the output load on the plant. |

The signals referenced in the alarm return are:

| | |
|---|---|
| CFA | Converter fail alarm lead. It interconnects the power modules with the control unit to monitor failures of converters. |
| RFA | Rectifier fail alarm signal lead. It interconnects the power modules with the control unit to allow the control unit to monitor failures of rectifiers. |
| C_O/S_OUT | ON/stby control for the converter. This signal interconnects the control unit by to the power modules on the secondary bus to be able to place them into standy remotely. |

-continued

| | |
|---|---|
| AR | Alarm return signal lead. This signal is the reference signal for control and monitor functions between the primary and secondary power modules and the control unit. |
| R_O/S_OUT | On/stby control for the rectifiers. It interconnects the rectifiers to the control unit and allows the control unit to place the rectifiers into standby remotely. |
| LT | Lamp test control signal. It interconnects the control unit to the power modules to allow the control unit to initiate lamp test. |
| ACF(1) and ACF(2) | AC fail detection signals from the rectifiers. |

The signals referenced to the secondary output bus are:

| | |
|---|---|
| C_CS+ | Current share signal for the secondary power modules. |
| C_CM+ | Current monitor signal for a converter only plant. |
| RING_ID1 and 2 | Control signal interconnections for ringer modules on the secondary output bus. They allow ringing modules to detect the presence of other ringers in a system |
| C_VADJ+ and C_VADJ− | Control signals for the secondary output power modules. They interconnect the control unit to the converters or ringers in a converter only plant to allow the control unit to vary the |
| C+ and C− | Secondary output voltage bus connections. |

We claim:

1. A power plant system, comprising:

a shelf including a backplane, the backplane having a pin receptacle connector, the pin receptacle connector having primary and secondary buses connected thereto;

a source of primary referenced control signals connected to the primary bus and a source of secondary referenced control signals connected to the secondary bus;

the pin receptacle connector also providing one or more modular plug-in locations, the shelf further disposed to receive plug-in power processing modules, each of said modules, when received, disposed to plug in to one of said plug-in locations;

each of said plug-in locations disposed to connect a module received therein to the primary and secondary buses in a first pinout arrangement if said received module is a rectifier; and each of said plug-in locations further disposed to connect a module received therein to the primary and secondary buses in a second pinout arrangement if said received module is a converter.

2. The power plant system of claim 1, further comprising a monitor and control unit, said unit monitoring and controlling the source of primary referenced control signals and the source of secondary referenced control signals.

3. The power plant system of claim 2, further comprising a source of alarm referenced control signals, the source of alarm referenced control signals feeding, responsive to the monitor and control unit, the source of primary referenced control signals and the source of secondary referenced control signals.

4. The power plant system of claim 1, further comprising a source of alarm referenced control signals, the source of alarm referenced control signals feeding the source of primary referenced control signals and the source of secondary referenced control signals.

5. A method of distributing power control signals comprising the steps of:

providing one or more modular connectors to which power processing modules of differing types may be connected, each modular connector predesigned so as to present a first connector configuration when the power processing module connected thereto is of a first type, each modular connector further predesigned so as to present a second connector configuration when the power processing module connected thereto is of a second type;

feeding a primary bus with a supply of primary referenced signals and a secondary bus with a supply of secondary reference signals;

connecting the primary bus and the secondary bus to the modular connectors, the first connector configuration permitting power processing modules of the first type to interface with primary referenced signals and secondary referenced signals according to a first mode, the second connector configuration permitting power processing modules of the second type to interface with primary referenced signals and secondary referenced signals according to a second mode.

6. The method of claim 5, in which power processing modules of the first type are rectifiers.

7. The method of claim 5, in which power processing modules of the first type are converters.

8. The method of claim 5, in which power processing modules of the first type are rectifiers and power processing modules of the second type are converters.

9. The method of claim 5, further comprising the step of:

monitoring and controlling the supply of primary referenced control signals and the supply of secondary referenced control signals.

10. The method of claim 9, further comprising the step of:

responsive to said monitoring and controlling step, feeding alarm referenced control signals to the supply of primary referenced control signals and the supply of secondary referenced control signals.

11. The method of claim 5, further comprising the step of:

feeding alarm referenced control signals to the supply of primary referenced control signals and the supply of secondary referenced control signals.

*12. A plug-in converter module for a power plant system having a plurality of power processing modules coupled to a backplane with primary and secondary buses, comprising:*

*a chassis:*

*power processing circuitry located within the chassis: and*

*an interface, coupled to the power processing circuitry and arranged in a plug-in connection pattern that is a function of an identity of the module, that is adapted to carry signals, including:*

*primary referenced control signals including primary bus power output connection signals, and*

*secondary referenced control signals, including:*

*current share signals for secondary power processing modules coupled to the secondary bus,*

*current monitor signals,*

*control signals for the secondary power processing modules, and*

*secondary bus output voltage connection signals.*

*13. The module of claim 12, wherein the interface is further adapted to carry alarm return referenced control signals, including:*

*fail alarm lead signals,*

*ON/standby control signals,*

*alarm return lead signals, and*

*lamp test control signals.*

*14. The module of claim 12, wherein the interface couples the module to sources of the primary and secondary referenced control signals.*

*15. The module of claim 12, wherein the interface couples the module to a source of alarm referenced signals.*

*16. The module of claim 12, wherein the interface includes an AC input connector that couples the module to a source of input AC power.*

*17. For use with a plug-in converter module for a power plant system having a plurality of power processing modules coupled to a backplane with primary and secondary buses, the module including a chassis and power processing circuitry located therein, an interface, coupled to the power processing circuitry and arranged in a plug-in connection pattern that is a function of an identity of the module, that is adapted to carry signals, comprising:*

*primary referenced control signals including primary bus power output connection signals, and*

*secondary referenced control signals, including:*

*current share signals for secondary power processing modules coupled to the secondary bus,*

*current monitor signals,*

*control signals for the secondary power processing modules, and*

*secondary bus output voltage connection signals.*

*18. The interface of claim 17, wherein the interface is further adapted to carry alarm return referenced control signals, including:*

*fail alarm lead signals,*

*ON/standby control signals,*

*alarm return lead signals, and*

*lamp test control signals.*

*19. The interface of claim 17, wherein the interface couples the module to sources of the primary and secondary referenced control signals.*

*20. The interface of claim 17, wherein the interface couples the module to a source of alarm referenced signals.*

*21. The interface of claim 17, wherein the interface includes an AC input connector that couples the module to a source of input AC power.*

*22. A method of operating a plug-in power converter module for a power plant system having a plurality of power processing modules coupled to a backplane with primary and secondary buses, comprising:*

*locating power processing circuitry within a chassis;*

*providing an interface arranged in a plug-in connection pattern that is a function of an identity of the module on an exterior wall of the chassis and coupled to the power processing circuitry; and*

*carrying, over the interface, signals, including:*

*primary referenced control signals including primary bus power output connection signals, and*

*secondary referenced control signals, including:*

*current share signals for secondary power processing modules coupled to the secondary bus,*

*current monitor signals,*

*control signals for the secondary power processing modules, and*

*secondary bus output voltage connection signals.*

*23. The method of claim 22, further comprising carrying, over the interface, alarm return referenced control signals, including:*

*fail alarm lead signals,*

*ON/standby control signals,*

*alarm return lead signals, and*

*lamp test control signals.*

*24. The method of claim 22, wherein the interface couples the module to sources of the primary and secondary referenced control signals.*

*25. The method of claim 22, wherein the interface couples the module to a source of alarm referenced signals.*

*26. The method of claim 22, wherein the act of coupling comprises coupling an AC input connector to the power processing circuitry to allow the module to be coupled to a source of input AC power.*

*27. A plug-in rectifier module for a power plant system having a plurality of power processing modules coupled to a backplane with primary and secondary buses, comprising:*

*a chassis:*

*power processing circuitry located within the chassis; and*

*an interface, coupled to the power processing circuitry and arranged in a plug-in connection pattern that is a function of an identity of the module, that is adapted to carry signals, including:*

*primary referenced control signals, including:*

*primary bus power output connection signals,*

*remote sense lead signals for primary power processing modules coupled to the primary bus,*

*current monitor output signals for the primary power processing modules,*

*voltage control lead signals for the primary power processing modules, and*

*current share control lead signals for the primary power processing modules, and*

*secondary referenced control signals including current share signals for secondary power processing modules coupled to the secondary bus and secondary bus output voltage connection signals.*

*28. The module of claim 27, wherein the interface is further adapted to carry alarm return referenced control signals, including:*

*fail alarm lead signals,*

*alarm return lead signals,*

*ON/standby control signals,*

*lamp test control signals, and*

*AC fail detection signals.*

*29. The module of claim 27, wherein the interface couples the module to sources of the primary and secondary referenced control signals.*

*30. The module of claim 27, wherein the interface couples the module to a source of alarm referenced signals.*

*31. The module of claim 27, wherein the interface includes an AC input connector that couples the module to a source of input AC power.*

*32. For use with a plug-in rectifier module for a power plant system having a plurality of power processing modules coupled to a backplane with primary and secondary buses, the module including a chassis and power processing circuitry located therein, an interface, coupled to the power processing circuitry and arranged in a plug-in connection pattern that is a function of an identity of the module, that is adapted to carry signals, comprising:*

*primary referenced control signals, including:*

*primary bus power output connection signals*

*remote sense lead signals for primary power processing modules coupled to the primary bus,*

*current monitor output signals for the primary power processing modules,*

*voltage control lead signals for the primary power processing modules, and*

*current share control lead signals for the primary power processing modules, and secondary referenced control signals including current share signals for secondary power processing modules coupled to the secondary bus and secondary bus output voltage connection signals.*

*33. The interface of claim 32, wherein the interface is further adapted to carry alarm return referenced control signals, including:*

*fail alarm lead signals,*

*alarm return lead signals,*

*ON/standby control signals,*

*lamp test control signals, and*

*AC fail detection signals.*

*34. The interface of claim 32, wherein the interface couples the module to sources of the primary and secondary referenced control signals.*

*35. The interface of claim 32, wherein the interface couples the module to a source of alarm referenced signals.*

*36. The interface of claim 32, wherein the interface includes an AC input connector that couples the module to a source of input AC power.*

*37. A method of operating a plug-in power rectifier module for a power plant system having a plurality of power processing modules coupled to a backplane with primary and secondary buses, comprising:*

*locating power processing circuitry within a chassis;*

*providing an interface arranged in a plug-in connection pattern that is a function of an identity of the module on an exterior wall of the chassis and coupled to the power processing circuitry; and*

*carrying, over the interface, signals, including:*

*primary referenced control signals, including:*

*primary bus power output connection signals,*

*remote sense lead signals for primary power processing modules coupled to the primary bus,*

*current monitor output signals for the primary power processing modules,*

*voltage control lead signals for the primary power processing modules, and*

*current share control lead signals for the primary power processing modules, and*

*secondary referenced control signals including current share signals for secondary power processing modules coupled to the secondary bus and secondary bus output voltage connection signals.*

*38. The method of claim 37, further comprising carrying, over the interface, alarm return referenced control signals including:*

*fail alarm lead signals,*

*alarm return lead signals,*

*ON/standby control signals,*

*lamp test control signals, and*

*AC fail detection signals.*

*39. The method of claim 37, wherein the interface couples the module to sources of the primary and secondary referenced control signals.*

*40. The method of claim 37, wherein the interface couples the module to a source of alarm referenced signals.*

*41. The method of claim 37, wherein the act of coupling comprises coupling an AC input connector to the power processing circuitry to allow the module to be coupled to a source of input AC power.*

*42. A plug-in ringer module for a power plant system having a plurality of power processing modules coupled to a backplane with primary and secondary buses, comprising:*

*a chassis;*

*power processing circuitry located within the chassis; and*

*an interface, coupled to the power processing circuitry and arranged in a plug-in connection pattern that is a function of an identity of the module, that is adapted to carry signals, including:*

*primary referenced control signals including primary bus power output connection signals, and*

*secondary referenced control signals, including:*

*current share signals for secondary power processing modules coupled to the secondary bus,*

*control interconnection signals for the secondary power processing modules,*

*control signals for the secondary power processing modules, and*

*secondary bus output voltage connection signals.*

*43. The module of claim 42, wherein the interface is further adapted to carry alarm return referenced control signals including alarm return lead signals and lamp test control signals.*

*44. The module of claim 42, wherein the interface couples the module to sources of the primary and secondary referenced control signals.*

*45. The module of claim 42, wherein the interface couples the module to a source of alarm referenced signals.*

*46. The module of claim 42, wherein the interface includes an AC input connector that couples the module to a source of input AC power.*

*47. For use with a plug-in ringer module for a power plant system having a plurality of power processing modules coupled to a backplane with primary and secondary buses, the module including a chassis and power processing circuitry located therein, an interface, coupled to the power processing circuitry and arranged in a plug-in connection pattern that is a function of an identity of the module, that is adapted to carry signals, comprising:*

*primary referenced control signals including primary bus power output connection signals, and*

*secondary referenced control signals, including:*

*current share signals for secondary power processing modules coupled to the secondary bus,*

*control interconnection signals for the secondary power processing modules,*

*control signals for the secondary power processing modules, and*

*secondary bus output voltage connection signals.*

*48. The interface of claim 47, wherein the interface is further adapted to carry alarm return referenced control signals including alarm return lead signals and lamp test control signals.*

*49. The interface of claim 47, wherein the interface couples the module to sources of the primary and secondary referenced control signals.*

*50. The interface of claim 47, wherein the interface couples the module to a source of alarm referenced signals.*

*51. The interface of claim 47, wherein the interface includes an AC input connector that couples the module to a source of input AC power.*

*52. A method of operating a plug-in power ringer module for a power plant system having a plurality of power processing modules coupled to a backplane with primary and secondary buses, comprising:*

*locating power processing circuitry within a chassis;*

*providing an interface arranged in a plug-in connection pattern that is a function of an identity of the module on an exterior wall of the chassis and coupled to the power processing circuitry; and*

*carrying, over the interface, signals, including:*

*primary referenced control signals including primary bus power output connection signals, and*

*secondary referenced control signals, including:*

*current share signals for secondary power processing modules coupled to the secondary bus,*

*control interconnection signals for the secondary power processing modules,*

*control signals for the secondary power processing modules, and*

*secondary bus output voltage connection signals.*

*53. The method of claim 52, further comprising carrying, over the interface, alarm return referenced control signals including alarm return lead signals and lamp test control signals.*

*54. The method of claim 52, wherein the interface couples the module to sources of the primary and secondary referenced control signals.*

*55. The method of claim 52, wherein the interface couples the module to a source of alarm referenced signals.*

*56. The method of claim 52, wherein the act of coupling comprises coupling an AC input connector to the power processing circuitry to allow the module to be coupled to a source of input AC power.*

* * * * *